July 31, 1928.  1,679,266

B. C. PLACE

FASTENER

Filed Nov. 25, 1927

Inventor
Bion C. Place
By James C. Hoffman
Attorney

Patented July 31, 1928.

1,679,266

UNITED STATES PATENT OFFICE.

BION C. PLACE, OF DETROIT, MICHIGAN, ASSIGNOR OF ONE-HALF TO GEORGE E. GAGNIER, OF DETROIT, MICHIGAN.

FASTENER.

Application filed November 25, 1927. Serial No. 235,638.

This invention relates to a fastener in which the parts cooperating to serve the fastening function are formed from a single piece of material. The fastener is intended particularly to secure fibrous or similar covering panels, with or without trim material, to the inside faces of automobile parts or bodies such as the inside faces of automobile doors, for example. The fastener is especially adapted for use in securing covering material of any kind to a supporting structure made of metal, such as sheet metal, and particularly where the fastener is applied through an opening in a metal supporting structure, the inner surface of which is relatively inaccessible, making it impractical to apply nuts or similar holding means to the fastener or to form a head such as a rivet head.

The primary object of the invention is to provide an extremely simple and inexpensive fastener, designed to pass through substantially aligned openings in the covering material and in the supporting structure, that includes a head of suitable form bearing upon the cover material around the opening and securing portions that are entered in the openings in the cover material and the supporting structure by merely pushing said portions through the openings, and which portions serve to automatically expand and firmly hold said structures together when they have been inserted in the openings.

A further object of the invention is to provide a fastener formed of a single piece of wire bent to form a head and a plurality of securing projections extending away from said head and each other, which projections are inherently resilient so that they may be moved from their operative position without substantially affecting the tendency existing therein for said members to spring to their original position.

A further object of the invention is to provide a fastener, for securing a plurality of perforated elements in superposed relation, so formed that it is unnecessary that the perforations in the superposed members be accurately in alignment, in order to secure a proper functioning of the fastener.

A further object of the invention is to provide a fastener for securing superposed perforated materials in juxtaposition, which fastener is operative without regard to variations in thickness of the superposed materials.

A further object of the invention is to provide a fastener for securing overlapped materials together by a simple straight line insertion of the fastener in aligned openings in said materials, which is capable of being inserted and removed without injury to the fastener or to the materials that are held in assembled relation by it.

A further object of the invention is to provide a fastener having a head portion and diverging holding and converging guiding portions, so arranged that the guiding portions serve to cause the diverging holding portions to be brought into alignment to permit the insertion of the fastener in operative position, and in which said diverging or holding portions spring apart after the fastener has reached its completely inserted position.

A further object of the invention is to provide a fastener having a head portion and resilient securing portions in which the resilient securing portions are so connected to the head portion that the head portion contributes substantially to the resilience of the securing portions.

A still further object of the invention is to provide a novel manner of utilizing the improved fastener of this application as a means for securing a U-shaped clip to a supporting structure with the sides of the clip extending outwardly away from said structure.

Further objects of the invention will appear as a description thereof proceeds with reference to the accompanying drawings in which.

Like reference characters indicate like parts throughout the several figures.

Figure 1:
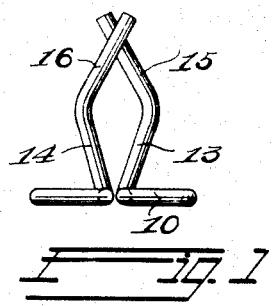
Figure 1 is a side elevation of the novel fastener of this invention.
Figure 2:
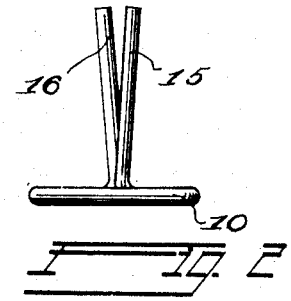
Figure 2 is a side elevation of the fastener viewed from a point 90° removed from the point from which the fastener is viewed in Figure 1.
Figure 3:
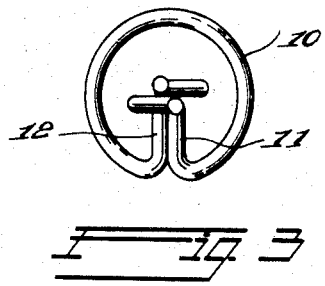
Figure 3 is a plan view of the fastener looking toward the under side of the head thereof.

Preferably the fastener is constructed of a single piece of wire of round or other suitable form, bent between its ends to form a head 10. Preferably, the head is circular in outline, but it will be understood that any other suitably formed head may be provided. Extending inwardly from the ends of the portion of the wire forming the head 10 and in the same plane with said portion, the arms 11 and 12 arranged side by side as shown in Figure 3. The ends of arms 11 and 12 are bent downwardly and away from each other to form holding portions 13 and 14, the ends of said portions being again bent toward each other to form guiding portions 15 and 16, the ends of which are arranged side by side (Fig. 2) and preferably slightly overlapped, as shown in Figures 1, 4, 5, 7 and 8. The overall width of ends of the overlapped portions should approximate the diameter of the apertures through which the fasteners are to be inserted to facilitate the entry of said ends in the apertures.

The wire used in forming the fastener just described is of such character that it is capable of being tempered or otherwise treated so that it will have the quality of a spring so that portions of the fastener have a relatively great inherent tendency to return to their original position when sprung therefrom.

Figure 4:
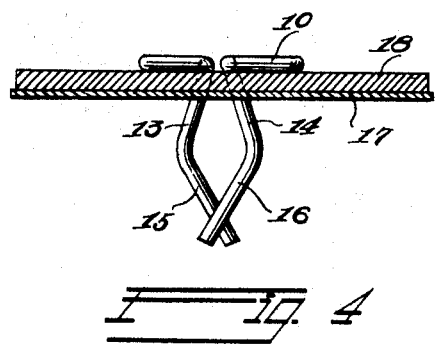
Figure 4 is a sectional view showing an application of the fastener.
Figure 7:
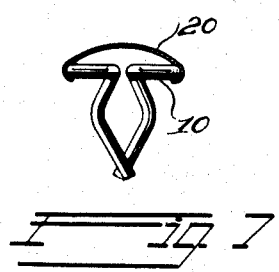
Figure 7 is a side elevation of the novel fastener provided with a metal cap superposed upon the head thereof to enhance the appearance of the device.

The fastener just described may be used as shown in Figure 4 illustrating an application of the fastener. In this figure 17 designates a supporting plate such as a sheet metal supporting plate of a part of an automobile body and 18 indicates a panel such as fibrous finishing panel with or without trim material. The plate 17 and panel 18 are provided with perforations that are approximately in alignment. The fastener is applied to these perforations by inserting the overlapped ends of the guiding portions 15 and 16 in the perforations and exerting a substantially straight line pressure against the head 10 of the fastener. The converging surfaces on said guiding portions cause the diverging holding members 13 and 14 to approach each other in opposition to the inherent resiliency of the fastener as the device is pushed through said apertures. As the fastener is forced through the aligned apertures the portions 13 and 14 spring apart due to their own resiliency and the torsion set up in the arms 11 and 12, forming a part of the head of the fastener as the diverging holding portions are caused to approach each other in forcing said portions through the apertures. The springing apart of the holding portions 13 and 14 as just stated serves to firmly secure the plate 17 and panel 18 in juxtaposition. It will be readily understood that it is unnecessary that the openings in the plate 17 and panel 18 be accurately alined or that the panel 18 be of a predetermined thickness, since it is obvious that the holding function will be secured without regard to whether the openings are in exact alignment and without regard to the thickness of the panel 18, the yielding holding portions automatically adjusting themselves to compensate for such variations. The frictional engagement of the diverging holding portions 13 and 14 with the relatively sharp edge of the perforation in the member 17 serves to hold the head 10 firmly in engagement with the panel 18. If desired, the friction between the holding portions and the edge of the perforation in the plate 17 may be greatly increased by providing the holding portions 13 and 14 with roughened surfaces, corrugations or teeth, such as shown at 19 in Figure 8.

If desired, the head 10 of the device may be covered by a metal, celluloid or similar button 20 that may be covered with cloth or any other desired material.

Figure 5:
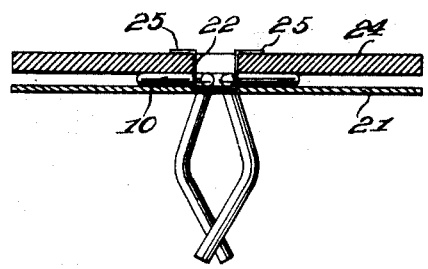
Figure 5 is a modification showing another application of the fastener utilizing an additional securing clip.
Figure 8:
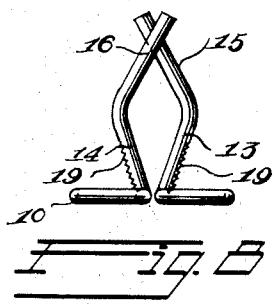
Figure 8 is a side elevation of a further modification of the fastener of Figure 1.
Figure 6:
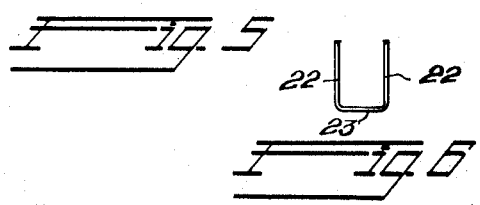
Figure 6 is a side view of the additional clip used in the form of the invention shown in Figure 5.

The fastener just described is also well adapted to secure a panel to a supporting plate in a manner providing a substantially flush joint. The manner in which this may be accomplished is illustrated in Figure 5 in which 21 indicates a perforated supported structure such as a metal plate. The improved fastener is applied to the perforation in said plate after the manner above indicated, with the head 10 thereof, resting against the outer surface of said plate and with the arms 11 and 12 arranged between the upstanding portions 22 of a U-shaped clip 23 illustrated in detail in Figure 6. The panel 24 that is to be secured to the supporting member 21 is then arranged over the head 10 with the perforation therein receiving the upstanding projections 22 of the U-shaped clip 23. In order to complete the assembly of the panel 24 and the member 21, the extreme ends of the projections 22 are bent in opposite directions at right angles into engagement with the top surface of the panel 24 as illustrated at 25 in Figure 5. This arrangement provides a connection in which the head of the fastener is concealed and presents a substantially flush outer surface.

The novel fastener may be readily withdrawn if it is desired to remove the covering material or panel for any reason. Such removal will not destroy or affect the usefulness of the fastener or mar the covering material, so that the reinsertion of the fastener and reuse of the covering material is practicable.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A spring fastener complete in itself comprising a head, a pair of arms secured to said head, and a resilient holding element carried by each of said arms and extending away from said head, said holding elements being disposed in a plane normal to said head and arranged normally in divergent relation to each other but being capable of being brought into approximate side by side arrangement in opposition to the torsion set up in said arms, whereby said torsion tends to firmly return said elements to their divergent position.

2. A one-piece wire fastener complete in itself comprising a head formed by bending the mid-portion of said wire into a substantially closed form, and bending portions of said wire toward the center of said closed form, and holding and guiding elements formed by bending the ends of said wire away from said portions in a plane normal thereto and bowing said ends between said portions and the tips thereof so that said ends diverge to form the holding elements and then converge to form the guiding elements.

3. A spring fastener complete in itself comprising a head having a pair of arms arranged in the plane of said head, a pair of relatively stiff holding elements projecting from the ends of said arms in a direction away from said head and diverging from each other, said diverging elements being designed to be brought into substantial alignment to be entered into an apertured member and to be then sprung apart by said arms and their own resilience to cause said head to bear upon said member around said aperture.

4. In combination, a pair of juxtaposed apertured members arranged with their apertures in substantial alignment, and a fastener having a head bearing on one of said members adjacent its aperture, and relatively stiff holding and guiding elements projecting away from said head through said apertures, said holding elements being divergent and arranged to bear against the edges of one of said apertures to firmly hold said members together and said guiding elements being convergent.

5. In combination, a pair of juxtaposed apertured members arranged with their apertures in substantial alignment, a fastener having a head bearing on one of said members adjacent its aperture, said head embodying a pair of arms arranged in the plane of said head, diverging holding elements projecting from the ends of said arms away from said head, U-shaped clips arranged with the bight thereof beneath said arms and projecting through the aperture in said other member, the free ends of said clips being bent in opposite directions in engagement with the outer surface of the other of said members.

6. A one-piece fastener complete in itself constructed of relatively stiff resilient spring wire comprising a head formed by bending the mid-portion of the wire to form a loop and by bending the ends of the loop inwardly side by side toward the center of the loop, and holding members formed by bending said ends away from said head to form divergent legs that may be sprung together to permit the insertion of said members in an aperture.

7. In combination, a perforated supporting member, a covering member disposed in lapped relation on said supporting member, and a spring fastener removably secured to said covering member for attaching said covering member to said supporting member comprising a head and a pair of resilient relatively stiff holding elements projecting away from said head through the perforation in said member, said holding elements diverging from each other to engage the edge of said perforation to firmly hold said covering member in engagement with said supporting member.

8. In combination, a perforated supporting member, a covering member disposed in lapped relation on said supporting member, and a one piece wire spring fastener removably secured to said covering member for attaching said covering member to said supporting member, comprising a head formed by bending the mid portion of said wire into a loop and bending the ends of said wire away from said loop in diverging directions to form resilient holding elements, said holding elements being yieldable so that they may be brought together to enter them into the aperture in said supporting member and to then spring apart to engage the sides of said aperture, whereby said covering member is firmly held to said supporting member.

9. In combination, a perforated supporting member, a covering member disposed in lapped relation to said supporting member and a one piece wire spring fastener removably secured to said covering member for attaching said covering member to said supporting member, comprising a head formed by bending the mid portion of said wire into a loop and bending the ends of said wire away from said loop in diverging directions to form resilient holding elements, the ends of said diverging elements being bent to converge toward each other to form guiding elements, said holding elements being yieldable so that they may be brought together when said guiding elements are entered into the aperture in said supporting member and to then spring apart to engage the sides of said aperture, whereby said covering member is firmly held to said supporting member.

10. A one piece wire spring fastener of relatively stiff material, comprising a head formed by bending the mid portion of said wire into a loop and bending the end portions of said wire away from said head so that said portions extend substantially at right angles to the plane of said loop, said end portions being bowed outwardly between said head and the tips of said portions to form converging guiding portions remote from said head and diverging holding portions adjacent said head, said fastener being complete in itself.

11. A one piece wire spring fastener of relatively stiff material comprising a head formed by bending the mid portion of said wire into a loop, then bending the end portions of said wire toward each other to a point within said loop to form a pair of arms disposed substantially in the plane of said head, the end portions beyond said arms being bent away from said head so that said portions extend substantially at right angles to the plane of said loop and arms, said end portions being bowed outwardly between said head and the tips of said portions to form converging guiding portions remote from said head, and diverging holding portions adjacent said head, said fastener being complete in itself.

BION C. PLACE.